United States Patent
Abegglen et al.

(10) Patent No.: US 9,323,489 B2
(45) Date of Patent: Apr. 26, 2016

(54) METHOD AND DEVICE FOR CONVERSION OF A PRODUCTION PLANT FOR THE POST PRINT PROCESSING

(71) Applicant: Mueller Martini Holding AG, Hergiswil (CH)

(72) Inventors: Christian Abegglen, Frauenfeld (CH); Markus Bracher, Pfaffnau (CH); Mark Rickenbacher, Sissach (CH); Christian Schmid, Rothrist (CH)

(73) Assignee: Mueller Martini Holding AG, Hergiswil (CH)

( * ) Notice: Subject to any disclaimer, the term of this patent is extended or adjusted under 35 U.S.C. 154(b) by 0 days.

(21) Appl. No.: 13/790,193

(22) Filed: Mar. 8, 2013

(65) Prior Publication Data

US 2013/0235425 A1 Sep. 12, 2013

(30) Foreign Application Priority Data

Mar. 9, 2012 (CH) ...................... 0339/12

(51) Int. Cl.
*G06K 15/00* (2006.01)
*B41F 13/54* (2006.01)
(Continued)

(52) U.S. Cl.
CPC .............. *G06F 3/1247* (2013.01); *B42C 19/00* (2013.01); *B42C 19/02* (2013.01); *B65H 2511/415* (2013.01); *B65H 2511/417* (2013.01); *B65H 2513/51* (2013.01); *B65H 2513/54* (2013.01)

(58) Field of Classification Search
CPC .......... G06F 3/1247; G06F 3/12; B65H 39/00
See application file for complete search history.

(56) References Cited

U.S. PATENT DOCUMENTS

2006/0087113 A1* 4/2006 Snyder ................... B42D 5/026
283/106
2009/0152787 A1* 6/2009 Sasaki ................ B65H 29/6609
270/1.01

(Continued)

FOREIGN PATENT DOCUMENTS

DE 10 2010 015128 A1 10/2011
EP 1777078 A1 4/2007

(Continued)

OTHER PUBLICATIONS

International Search Report issued in Swiss priority application No. 00339/12 mailed Jul. 13, 2012.

(Continued)

*Primary Examiner* — Tammy Pham
*Assistant Examiner* — Frantz Bataille
(74) *Attorney, Agent, or Firm* — Robert Kinberg; FisherBroyles LLP

(57) ABSTRACT

A method and device for the conversion of a production plant for the post print processing, which production plant includes several post print processing machines and a plant central control unit. The method and device may be used for successively processing different production orders for turning partial products into finished print products. According to the method, it may first be determined when a last partial product of a first production order has left a post print processing machine. The post print processing machine may then be automatically and/or semi-automatically converted by the plant central control unit. The method may include determining, by the plant central control unit, when the conversion of the post print processing machine has been completed.

14 Claims, 4 Drawing Sheets

(51) Int. Cl.
*B42D 15/00* (2006.01)
*G06F 15/173* (2006.01)
*G06F 3/12* (2006.01)
*B42C 19/00* (2006.01)
*B42C 19/02* (2006.01)

(56) References Cited

U.S. PATENT DOCUMENTS

2010/0091311 A1* 4/2010 Sato ................ B65H 31/24
358/1.12
2011/0101600 A1* 5/2011 Chihara et al. ............. 271/152
2011/0320586 A1* 12/2011 Maltz .................... G06F 9/5027
709/224

FOREIGN PATENT DOCUMENTS

EP 2377688 A2 10/2011
WO WO-2012/048435 A1 4/2012

OTHER PUBLICATIONS

Dieter Liebau et al., "Industrielle Buch-Binderei" [Industrial Bookbinding] 2001; Publishing House: Beruf + Schul, Itzehole XP002677535, ISBN:3-88013-596-7; p. 519.

* cited by examiner

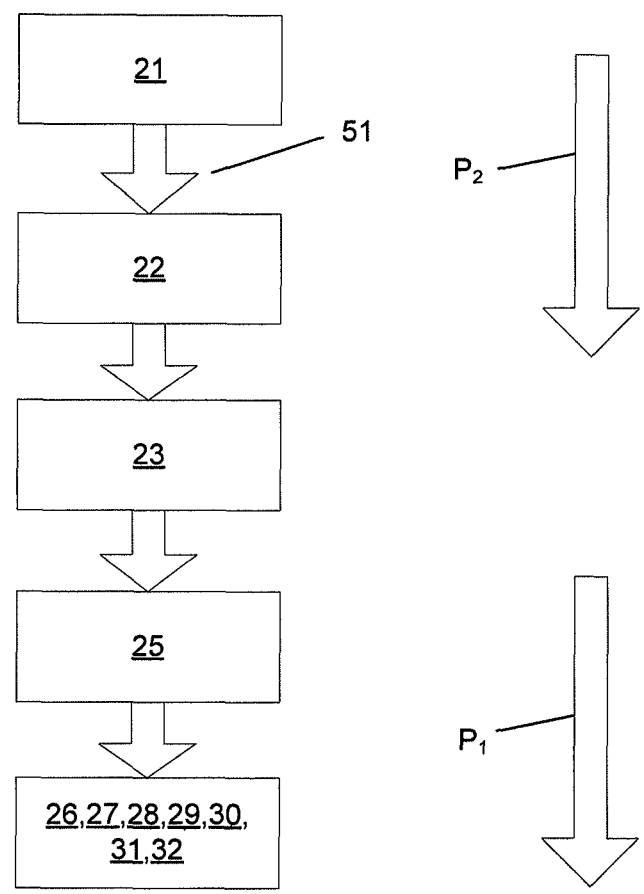

METHOD AND DEVICE FOR CONVERSION OF A PRODUCTION PLANT FOR THE POST PRINT PROCESSING

CROSS-REFERENCE TO RELATED APPLICATION

This application claims the priority benefit under 35 U.S.C. §119(a) of Swiss Patent Application No. 00339/12, filed on Mar. 9, 2012, the entirety of which is incorporated herein by reference.

BACKGROUND OF THE INVENTION

The present invention relates to a method and a device for converting a production plant provided with a plant central control unit and consisting of several machines that are respectively provided with a separate control unit and are used for the post print processing, wherein different production orders are processed successively with said method in order to turn partial or semi-finished products into finished print products.

During the post print processing operation, partial products such as individual sheets containing a plurality of pages for the finished print product are turned with the aid of several temporally successive processing steps into finished print products, e.g. magazines, catalogs, books, newspapers or similar products. This type of processing takes place on a plurality of machines for the post print processing which are linked together to form a production line. In the process, post print processing machines designed for producing the finished products take over the partial or semi-finished print products from an upstream-arranged post print processing machine and, following the processing, transfer these to another post print processing machine.

Traditional printing presses are for the most part operated "offline," meaning the printing press is operated independent of the post print processing. Individual sheets are produced in the printing press and are then stored temporarily. As soon as all sheets required for collating a book are printed, the post print processing operation can take place.

With digital printing presses, it is possible to sequentially print the sheets of a book and thus form sheet packets that form a book. Digital printing presses of this type are frequently operated "inline" with the post print processing operation, meaning the digital printing press is linked to the post print processing to form a joint production line.

A book binding plant can be used, for example, for the post print processing operation. A plant of this type generally comprises a collating machine for gathering a number of print sheets that form a finished print product, a binding machine, such as an adhesive or perfect binder, a removal device which can contain a curing section for the adhesive if a perfect binder is used, a cutting machine for trimming the side edges of the partial product received from the perfect binder, if applicable along three sides, and a stacking device for stacking the print products. Additional machines for the post print processing can also be used, such as an inserting machine for inserting loose products into the bound print products.

In part, production lines are long and complex and are composed of the aforementioned post print processing machines. The sequence in which the post print processing machines are arranged is predetermined by the further processing that is required for the partial products. Depending on the finishing process, the partial products pass through all or only some of the post print processing machines and are processed therein. A post print processing machine which is not involved in the active processing can only be used for the transport of the partial products.

Production lines of this type are normally operated by several persons. In case of a change in the production order, the operators in charge convert the machines for the post print processing while auxiliary personnel removes or supplies corresponding partial products. The post print processing machines are generally configured for any production order to be processed in a production plant and are set up according to a production order in such a way that the processing of the partial products can take place as specified.

Alternatively, a single operator can also successively convert each post print processing machine of a production plant. Once the operator has converted the last one of the post print processing machines, the new production order can be started. However, this action involves a long conversion period for the total production plant and consequently requires a long standstill time for the upstream arranged digital printing press. To convert the production plant between production orders, it is initially operated without load and is then converted.

The digital printing technology provided the option of combining the printing process with the post print processing operation in a joint production plant and thus made it possible to operate the complete process "inline." A reduction in the number of operating personnel required for a production plant of this type therefore results in an increase in the economic efficiency of these types of digital print production plants.

In many cases, the digital printing press can be converted much faster than the following machines for the post print processing. If the conversion time for the post print processing operation takes only insignificantly longer than the conversion time for the digital printing press, then the digital printing press can be restarted immediately after its conversion, wherein the partial products are transported to a buffer section during the conversion of the post print processing machines. A relatively long conversion time for the post print processing operation, however, results in a poor utilization of the digital printing press.

The post print processing machines are generally controlled with the aid of separate machine control units which communicate via standardized bus interfaces. These machine control units can additionally be linked to a plant central control unit. An arrangement of post print processing machines is known from the prior art publication WO2012048435 A1 for which a plant central control unit is connected to local machine control units. The machine control units determine the required conversion times for the respective post print processing machines from the control data received from the central control unit. The computed conversion times are then transmitted by the individual machine control units to the plant central control unit which, in turn, determines gaps in the conveying goods for the complete plant. Accordingly, the individual machine control units do not provide direct feedback of the current setup parameters for the respective post print processing machine to the plant central control unit.

A production plant for the post print processing, comprising two production lines, is also known from the EP 1777078 A1, wherein these production lines are respectively composed of post print processing machines. The two production lines in this case contain parallel-switched as well as jointly operated post print processing machines. With this production plant, some of the post print processing machines can be operated without load and can be converted for a new production order while other, parallel switched, machines for the post print processing are still processing the current production order. The disadvantage of the described arrangement is that a relatively high number of redundant post print processing machines are required for this, thereby resulting in relatively high total costs for the production plant.

The DE 102010015128 A1 discloses a single post print processing machine which is embodied as perfect binder and comprises a plurality of continuously circulating clamps of a transporting device for the fast conversion to different formats of successively processed orders. For this, a cycle time of the post print processing machine is extended, corresponding to the required format change for the following production order to be processed, by leaving some clamps of the transport arrangement for the partial products empty, such that more time is available for the pre-adjustment of processing stations of the perfect binder to conform to the following production order.

SUMMARY OF THE INVENTION

It is an object of some embodiments of the present invention to provide a method and a device which may allow the fast and personnel-saving conversion of a production plant composed of post print processing machines that can be converted automatically and/or semi-automatically.

According to an example embodiment of the invention, a method for conversion of a production plant for post print processing to change from a production order to a next production order may be provided. The production plant may include a plant central control unit and at least one post print processing machine provided with a separate machine control unit for successively processing different production orders, so as to turn partial products into finished print products. The method may include: determining when a last partial product of a first production order processed in the production plant has left the at least one post print processing machine; transmitting from the respective machine control unit of the at least one post print processing machine to the plant central control unit that the post print processing machine is ready to be converted to a following production order; transmitting from the plant central control unit to the respective machine control unit the instructions for the conversion; converting the post print processing machine, either fully automatically or semi-automatically, depending on the partial products for the following production order to be processed in the production plant; determining when the conversion of the post print processing machine is completed; and transmitting the completion of the conversion from the machine control unit to the plant central control unit.

According to an embodiment of the inventive method, at least one post print processing machine in the production line may be divided into segments and/or a segment may be formed with at least one post print processing machine. In the process, a segment may be converted as soon as a last partial product of a production order has left this segment. The flexible and modular division of the production plant into segments may offer the advantage that the segments forming components of the production plant can be converted to meet the specifications of the following production order.

According to another embodiment of the inventive method, the conversion may take place immediately after a last partial product of a production order has left the post print processing machine. An additional advantage resulting therefrom may be that only short interruptions occur between two production orders.

In addition, a time-saving, continuous conversion of the production plant that meets the respective production order can be designed correspondingly if the post print processing machines in the production plant are converted successively, in the sequence in which a last partial product of a production order leaves those machines.

According to another embodiment of the method, the conversion of the post print processing machines and/or the segments of the production plant may be provided with the aid of a plant central control unit which coordinates and/or controls the conversion. A central control point may thus be obtained which can be used, for example, to effect a desired adaptation of the method.

In still another embodiment of the method according to the invention, the production plant may be configured to form a production line by activating the post print processing machines and/or the segments of the production plant in dependence on the respective production order via the individual machine control units and/or via the super-imposed plant central control unit. The post print processing machines and/or the segments of the production line may be converted after a last partial product of a production order has left this post print processing machine and/or this segment. An optimum adjustment option may thus be obtained for the complete production plant for each production order.

According to another embodiment, a device for converting a production plant for post print processing to change from a production order to a next production order may be provided. The production plant may include a plant central control unit and at least one post print processing machine, wherein the production plant is used to successively process different production orders for turning partial products into finished print products. The device may include a separate machine control unit associated with the at least one post print processing machine. The device may include at least one fully automatic and/or semi-automatic actuator associated with the at least one post print processing machine. The actuator may be connected to the plant central control unit. The device may include a product detection device associated with the at least one post processing machine and connected to the plant central control unit. The product detection device may be configured to determine when a last partial product of a first production order has left the at least one post print processing machine. The machine control unit of the at least one post print processing machine may be configured to transmit to the plant central control unit a readiness of the at least one post print processing machine to be converted. The machine control unit may be configured to receive instructions for the conversion from the plant central control unit. The actuator may be configured to fully automatically or semi-automatically convert the at least one post print processing machine based on the instructions depending on partial products of a following production order to be processed in the production plant. The machine control unit may be configured to determine when the conversion of the at least one post print processing machine is complete. The machine control unit may be configured to transmit information to the plant central control unit upon completion of the conversion.

According to an embodiment, at least one post print processing machine may be divided into segments and/or at least one post print processing machine may form a segment, wherein the individual segments may be embodied for a fully automatic and/or a semi-automatic conversion. The flexible and modular division of the production plant into segments may have the advantage that the segments which represent sections of the production plant can be converted to meet the specifications for the following production order.

According to another embodiment, several post print processing machines and/or segments of the production plant can be configured with the aid of the plant central control unit to form a production line, in dependence on the respective production order. The post print processing machines and/or the segments of the production plant may be embodied for this in such a way that they can be converted fully automatically or semi-automatically. As a result of its modular design, the production plant can be converted quickly to meet the new production order.

In yet another embodiment of the inventive device, the post print processing machines may each be equipped with a separate machine control unit that is connected to the plant central control unit, wherein the plant central control unit as well as the individual machine control units may be connected via a joint bus system. As a result, it may be advantageously possible to individually activate and query the post print processing machine.

The control units of the post print processing machines according to an embodiment of the inventive device may be connected to sensors for the product detection. These sensors can be designed differently and can, for example, be arranged so as to detect and transmit the precise instant when a partial product leaves the post print processing machine.

A production plant equipped with the device according to the invention can be, for example, a plant for producing perfect-bound products or a plant for the gathering and wire-stitching/thread-stitching of products. Of course, the production plant can also comprise a post print processing machine in the form of a printing press, in particular a digital printing press. A buffer section can additionally be arranged between the digital printing press and one of the post print processing machines, so as to gain time for the conversion of following print processing machines.

BRIEF DESCRIPTION OF THE DRAWINGS

These and other features and advantages of the invention will be further understood from the following detailed description of some example embodiments with reference to the accompanying drawings. All elements not needed for a direct understanding have been omitted. The same elements in different Figures are given the same reference numbers, wherein:

FIG. 4 Depicts an illustrative flow chart showing a section during the production order change according to an embodiment of the invention.

DETAILED DESCRIPTION

Figure 1:
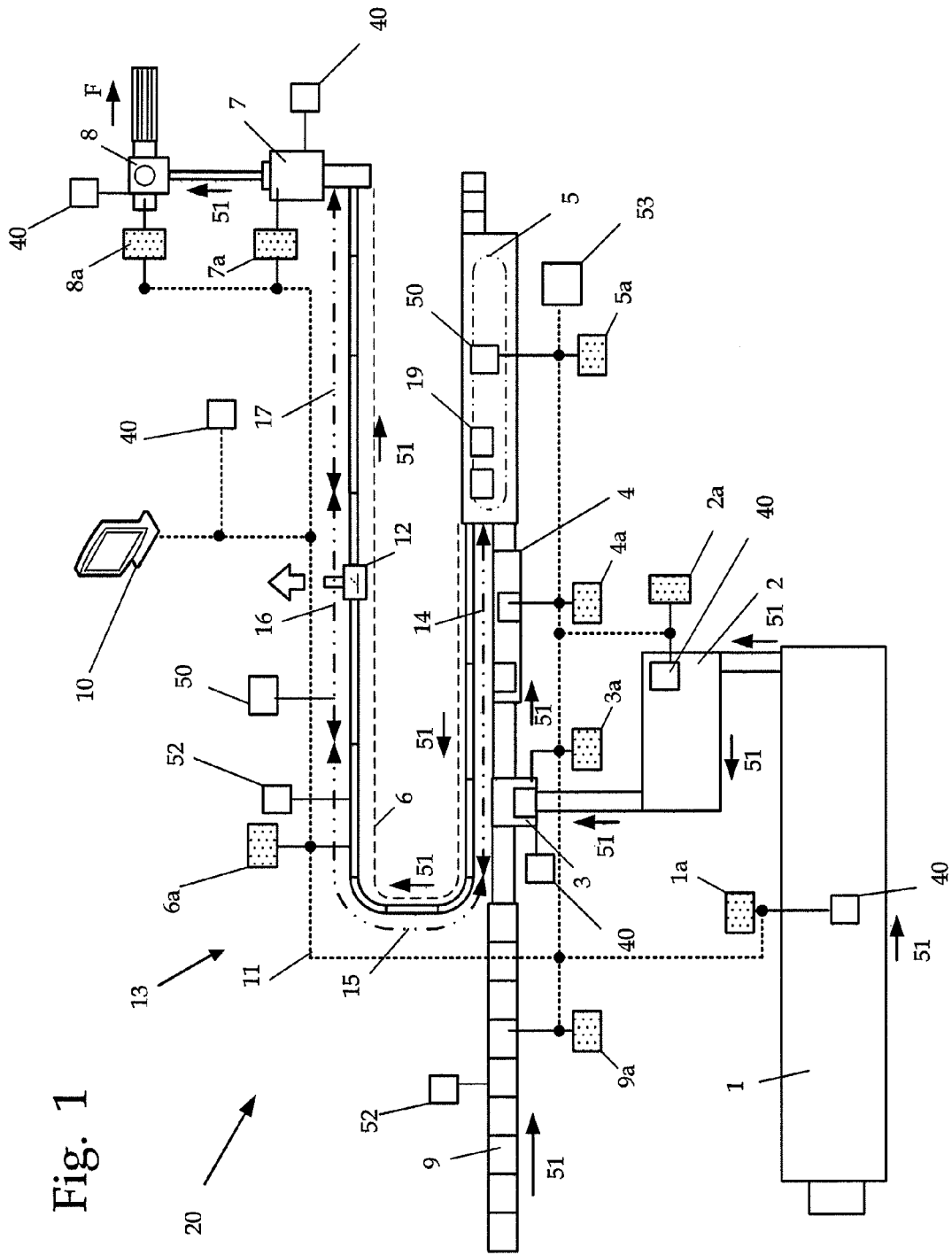
FIG. 1 Shows a schematic representation of a device for which the post print processing machines are provided with automatic actuators for the conversion according to an embodiment of the invention.

FIG. 1 shows a production plant 20 equipped with several post print processing machines 1 to 9, shown in a simplified drawing according to an embodiment of the invention. The following components form the example production plant 20: a post print processing machine 1 embodied as a digital printing press; a post print processing machine 2 embodied as buffer section; a post print processing machine 3 embodied as book block feeder; a post print processing machine 4 embodied as fly leaf feeder; a post print processing machine 5 embodied as a binder; a post print processing machine 6 embodied as a discharge element; a post print processing machine 7 embodied as a cutting machine; a post print processing machine 8 embodied as a stacker; and a post print processing machine 9 embodied as a gathering machine.

All post print processing machines 1 to 9 of the production plant 20 may be provided with separate machine control units 1a to 9a as well as a separate status indicator 53 which is connected via a bus system 11 to a super-imposed plant central control unit 10. The bus system 11 which is shown herein as a wire connection can also be wireless, for example based on optical signal connections.

Each machine control unit 1a to 9a may be responsible for the functions of the respective post print processing machine 1 to 9. The super-imposed plant central control unit 10 may coordinate the activation of the post print processing machines 1 to 9 in the group. The plant central control unit 10 can combine and/or configure the post print processing machines 1 to 9 to form different production lines 13.

Depending on the configuration of the post print processing machines 1 to 9 in a production line 13, bound books or book blocks can be produced as shown in the following. For the following three variants of the book production, the production line 13 with a product flow 51 may comprise the above-referenced post print processing machines 1 to 9, wherein no post print processing machines 1 to 9 of the same type are connected in parallel.

In a first production line 13, the sheets may be gathered in a gathering machine 9 and the sheet stacks may be transported via the fly leaf feeder 4 to the binder 5. In the binder 5 embodied, for example, as perfect binder or adhesive binder, the sheet stacks may be processed along the back and provided with glue, the cover may be fitted on, and the book back may then be shaped. The discharge element 6 may then transport the so-called raw or unfinished books to the cutting machine 7, wherein the adhesive can harden in the meantime. In the cutting machine 7, for example embodied as a three-way trimmer, the raw or unfinished books may be trimmed along the top, bottom and front edges, so that a finished book is created. The finished books may then be stacked and delivered in the stacker 8.

With a second production line 13, the individual pages of a book may be printed and combined in the digital printing press 1, wherein gathered sheet stacks may be generated which are then supplied to a buffer section 2. The buffer section 2 may convey the sheets stacks via a book block feeder 3, arranged upstream of the fly leaf feeder 4, to a transport chain of a transfer device. The sheet stacks may travel by way of the fly leaf feeder 4 to the binder 5 where the processing may be continued in accordance with the first production line described above.

The sheets stacks of a third production line 13 may be formed inside the gathering machine 9 and may then be combined with sheet stacks from the digital printing press 1 to form complete sheet stacks for books. The combining of the stacks may be carried out in the book block feeder 3, wherein sheet stacks from the gathering machine 9 may be combined with sheets stacks from the book block feeder 3, for example with the same division as a transport chain embodied as a transport element. The processing to form complete books may then take place as described for the above-mentioned first and second production lines.

For the book block production, fly leaves may be glued on in the fly leaf feeder 4 and the sheet stack formed in this way may then be supplied to the binder 5. In the binder 5, embodied, for example, as a perfect or adhesive binder, the sheet stacks may be processed along the back and/or may be compressed and provided with adhesive. The adhesive may be covered with a backing strip and the unfinished book blocks may then be transferred to the discharge element. The hardening of the adhesive, the trimming on three sides and the stacking may be carried out in the same way as for the book production. The sheet stacks can be combined in accordance with the above-described first, second, and third production lines.

The above-described processes may be controlled by the plant central control unit 10 and may be realized along the production line 13. The plant central control unit 10 can furthermore be responsible for the process control between the post print processing machines 1 to 9, for the workflow, and for any interference and alarm management. One function belonging to the workflow may involve the control of the conversion of the post print processing machines 1 to 9 and the timely transfer of the parameters belonging to the new production order. The plant central control unit 10 can be connected to a product detection device 40 and also to additional computers (not shown) for the data exchange within an operation. As a result, the production orders $P_1, P_2 \ldots P_n$ ($P_1$, $P_2$ from FIGS. 3 and 4) can be transmitted, for example, by a central production order administration to the production line 13 and the operating data can be transmitted to an operating data recording device. Alternatively or concurrently, an Internet connection can be established. Each time when a last partial product of a production order $P_1, P_2 \ldots P_n$ has left a post print processing machine 1 to 9, the respective machine may be converted fully automatically or semi-automatically by an actuator 50 to meet the specifications for processing the partial products of the next production order $P_1, P_2 \ldots P_n$.

Figure 2:
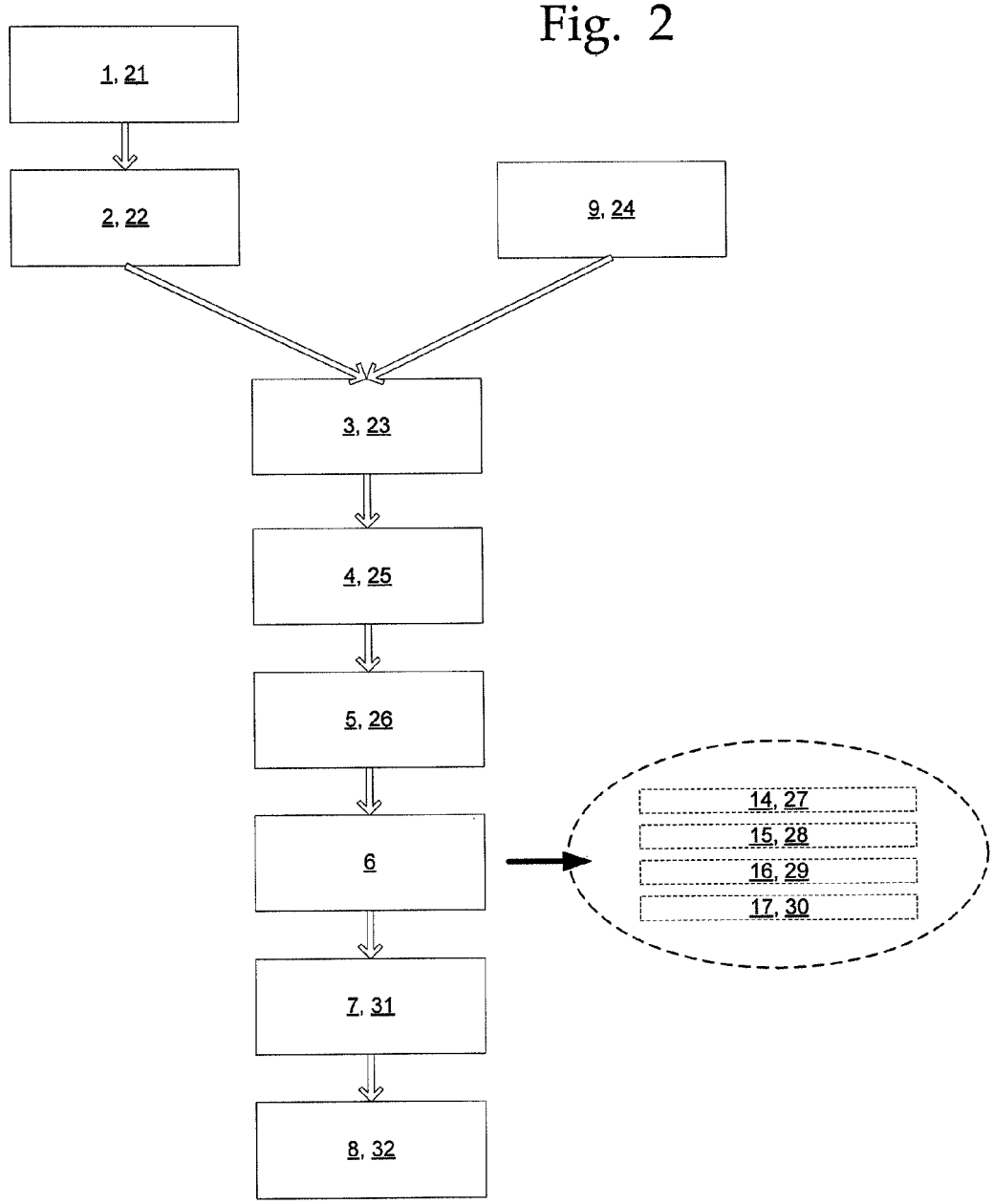
FIG. 2 Depicts an illustrative flow chart showing production lines according to an embodiment of the invention.

The illustrative flow chart depicted in FIG. 2 shows three production lines 13 of the production plant 20, illustrated in FIG. 1, which correspond to the above-described variants for the book production. The three production lines 13 in this case are divided into segments, in the following referred to as segments 21 to 32. The individual segments correspond for the most part to the post print processing machines 1 to 9. However, this division is not absolutely necessary. Each post print processing machine 1 to 9 can, in turn, be divided into segments 19 or post print processing machines 1 to 9 can also be combined to form a single segment. For example, it may be useful for the discharge element 6 to subdivide the total transport section into further segments, shown in FIG. 1 as the transport belts 14 to 17. These four transport belts are shown herein, for example, as segments of a post print processing machine 6, embodied as discharge element, wherein of course different post print processing machines 1 to 9 can also be divided into segments 19. The transport belt 16 may be assigned an emergency discharge diverter 12, as shown in FIG. 1, which may function to avoid a jam either on or following the discharge element 6 in case of a possible malfunction in one of the post print processing machines 1 to 9.

For the processing of partial products, the plant central control unit 10 can configure the production plant (20) with the aid of a logical lineup of the individual segments 21 to 32 to form a production line 13. The configuration can be changed, depending on the production order $P_1, P_2 \ldots P_n$. A defined configuration is required for each production order $P_1, P_2 \ldots P_n$ so that the partial products can be produced in the desired manner.

Figure 3:
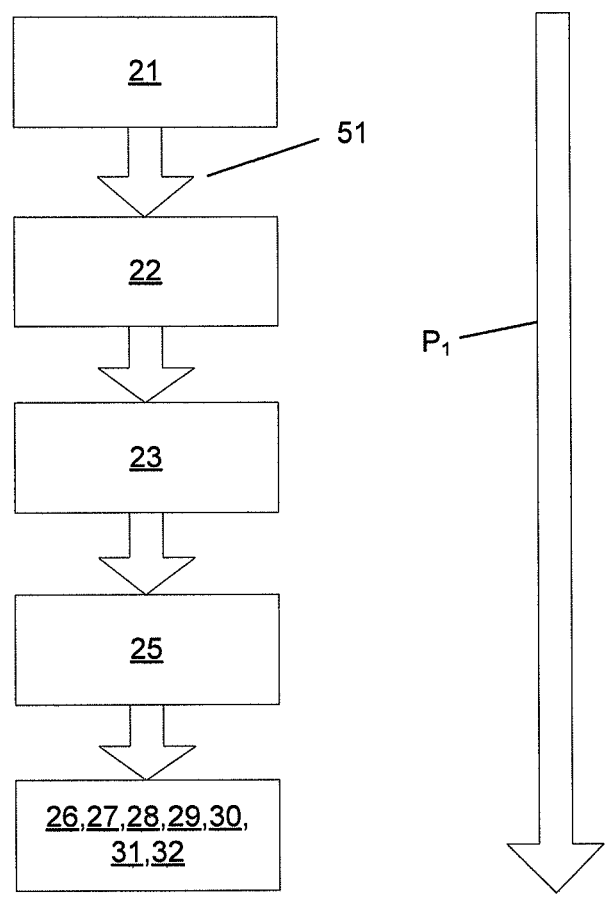
FIG. 3 Depicts an illustrative flow chart showing a section prior to a production order change according to an embodiment of the invention.

For the exemplary embodiments according to FIGS. 3 and 4, the plant central control unit 10 may activate the production line 13 in such a way that several different production orders $P_1, P_2 \ldots P_n$ are processed simultaneously on different segments of the production line. In FIG. 3, for example, the segments 21 to 23 and 25 to 32 may form the production line 13. Each segment may be given the task of processing one order $P_1$ by the plant central control unit 10.

FIG. 4 shows a production order change from the order $P_1$ to a production order $P_2$ according to an embodiment of the invention. The segments 25 to 32 may process the production order $P_1$. The production order $P_2$ is shown as already being processed in segment 21. In segment 23, on the other hand, the respective post print processing machine is in the process of being converted from production order $P_1$ to production order $P_2$. Once the last book of the production order $P_1$ has left the segment 23, the respective machine control unit may report that the segment 23 has completed the production order $P_1$.

The plant central control unit 10 may then transmit to the segment 23 the instruction for converting to the production order $P_2$. The respective machine control unit may subsequently trigger the conversion of the respective post print processing machine of the segment 23 to meet the new production order $P_2$.

In segment 22, the machine control unit may have triggered the conversion of the respective post print processing machine and may have informed the plant central control unit 10 that the conversion has been completed. The plant central control unit 10 may then respond at the appropriate point in time by issuing the command for processing the production order $P_2$. The segment 22 can take over the partial products for the production order $P_2$ from the upstream-arranged segment 21 and may then again be ready for operation and the processing of the production order $P_2$.

The production order data for the production order $P_2$ can be sent to the respective post print processing machine prior to the conversion of the production line to change from the production order $P_1$ to the production order $P_2$. The post print processing machine can accept the data for at least one additional production order into its machine control unit prior to and/or at the time of conversion.

With the above-described method, it may therefore be possible to simultaneously process several production orders $P_1, P_2 \ldots P_n$ on the production line 13. At least the time interval which is required to convert that segment of the production line 13 that requires the longest conversion time is needed between the production orders.

With the aid of the plant central control unit 10, the post print processing machines 1 to 9 of the production line 13 can be configured and/or can be adapted to the production order via the corresponding machine control units 1a to 9a of the individual post print processing machines. The use of the above-referenced method for configuring the production line 20 is not restricted to perfect binder lines. The method can also be used for configuring the production plants 20 with post print processing machines 1 to 9 which can be linked in different ways, so as to form gathering lines, insertion lines and similar production lines for the post print processing.

A production line for the inline production of digitally printed hardcover books can comprise, for example, the following post print processing machines: a bookmark inserting machine (not shown) for inserting a book mark into a book block in this case can be arranged following the cutting machine 7. A book casing-in line can also follow, which is used for the rounding, applying adhesive to the back and the casing-in of the book block, as well as for the burning and pressing in of a fold.

A different production line for the inline production of gathered and stitched digital printing products can furthermore comprise the following print processing machines (not shown): a folding and gathering device, designed to generate a plough fold, trim the back to the correct length and gather items to form individual partial products; a gathering and stitching machine, a stitching device with one or several feeders, stitching units and three-way cutters; a foil wrapping machine for wrapping the individual products with a clear foil or film; a strapping machine which wraps a band around a stack composed of finished printed products, so that the stack holds together; and a palletizer which deposits the product stacks onto pallets.

The machine control units 1*a* to 9*a* may detect and transmit the operating state at any point in time, wherein each machine control unit 1*a* to 9*a* detects the location of the partial products and tracks these products with the aid of sensors 52. By tracking the products, the machine control unit 1*a* to 9*a* can determine when the last partial products of a production order $P_1, P_2 \ldots P_n$ to be completed has been processed and can transmit this information to the plant central control unit 10. The machine control units 1*a* to 9*a* of the post print processing machines 1 to 9 may detect the transfer out or removal of partial products, whereupon this information may also be transmitted to the plant central control unit 10. The plant central control unit 10 may process this information by, for example, increasing the required number of partial products of a production order, depending on the selected user settings, and/or by recording it in a so-called "JMF" (job messaging format) file. When increasing the number of partial products of a production order, this information may be transmitted to the first one of the post print processing machines in the production line 13 and this machine may then produce the new number of partial products for achieving the production order run. Once the first one of the post print processing machines has reached the required number of partial products of a production order, this information may be transmitted to the plant central control unit 10. The plant central control unit 10 may then coordinate the further activities of the post print processing machines 1 to 9, wherein this may involve, for example, an empty run and an operational stop, or a conversion to a new production order.

Identification marks can be affixed as additional aids to the partial products which make it possible for each machine control unit to control and/or monitor the product tracking.

If no production order is processed in the production line, the conversion of the post print processing machines can also take place simultaneously. That is to say, all post print processing machines 1 to 9 which are configured to form a production line may be converted to meet the requirements of a following production order, specified by the plant central control unit 10, as soon as the plant central control unit 10 initiates this conversion.

If a post print processing machine 1 to 9 cannot undergo the conversion without intervention by the operating personnel, the following action may be required: the completion of the production order $P_1$ by a segment 21 to 32 may be transmitted by the machine control unit 1*a* to 9*a* of the associated machine to the plant central control unit 10. The plant central control unit 10 may then issue a command for converting this segment to the production order $P_2$. If a manual intervention by an operator is required for a partially automatic conversion of a post print processing machine 1 to 9, the machine may be stopped and the operator may be asked to carry out the required manual intervention. As soon as the manual intervention has been performed, this may be confirmed through an input at an operating panel of the respective machine control unit and the conversion of the segment may continue automatically, as described above.

For a quick and efficient conversion of the production plant 20 to change from one production order $P_1, P_2 \ldots P_n$ to the next one, post print processing machines should be used, if possible, which do not require a manual intervention during the conversion. The post print processing machines 1 to 9 which do not require such manual intervention may be provided with motorized adjustment axes and may be equipped, for example, with feeders for supplying multiple items such as multiple fly leaves at the fly leaf feeder and multiple covers at the binder. As a result, the exchange of partial products, which for our example involves the fly leaves and the covers, may be uncoupled from the conversion process. The operator can remove the fly leaves and/or the covers remaining from the preceding production order during the processing of a current order and can deposit the fly leaves and/or the covers for the following production order without interfering with the running production order.

A further option is the use of multiple processing stations installed in a post print processing machine 1 to 9. For example, a binder can have several identical processing stations which are used depending on the requirements for the production order. To attach a backing strip to a book back, for example, different pressing bars are needed in a pressing station than for attaching covers. The conversion can thus be realized without manual intervention if, for example, two pressing stations are provided, one of which is equipped with pressing bars for processing backing strips while the other pressing station is provided with pressing bars for the processing of covers.

It will be understood that the above description of the present invention is susceptible to various modifications, changes and adaptations, and the same are intended to be comprehended within the meaning and range of equivalents of the appended claims.

What is claimed is:

1. A method for re-configuring a production plant for post print processing to change from one production order to a following different production order, the production plant including a plant central control unit and a plurality of post print processing machines each included with a separate machine control unit for successively processing different production orders, so as to turn partial products into finished print products, the method comprising:

determining when a last partial product of a first production order processed in the production plant has left each one of the plurality of post print processing machines;

transmitting from the machine control unit of each post print processing machine to the plant central control unit that the post print processing machine is ready to be re-configured to the following different production order;

transmitting from the plant central control unit to the machine control unit of each post print processing machine the instructions for the re-configuring;

successively re-configuring the plurality of post print processing machines in sequence as the last partial product of the first production order leaves each post print processing machine, either fully automatically or semi-automatically, depending on the partial products for the following different production order to be processed in the production plant;

determining when the re-configuring of each post print processing machine is completed; and transmitting the completion of the re-configuring from the machine control unit of each post print processing machine to the plant central control unit.

2. The method according to claim 1, wherein at least one of the plurality of post print processing machines of the production plant is divided into segments and/or the at least one of the plurality of post print processing machines forms a segment, the method further comprising:
re-configuring the segment as soon as the last partial product of the first production order has left the segment.

3. The method according to claim 2, wherein the re-configuring begins immediately after the last partial product of the first production order has left the each one of the plurality of post print processing machines or the segment.

4. The method according to claim 2, further comprising:
centrally coordinating and/or controlling the re-configuring of the plurality of post print processing machines and/or the segments of the production plant.

5. The method according to claim 2, wherein several of the plurality of post print processing machines and/or the segments of the production plant form a production line for a respective production order, the method further comprising:
re-configuring the plurality of post print processing machines and/or the segments of the production line after the last partial product of a respective production order leaves each post print processing machine and/or segment.

6. The method according to claim 5, further comprising:
controlling the production line by the plant central control unit.

7. A device for re-configuring a production plant for post print processing to change from one production order to a following different production order, the production plant including a plant central control unit and a plurality of post print processing machines, wherein the production plant is used to successively process different production orders for turning partial products into finished print products, the device comprising:
a separate machine control unit associated with each of the plurality of post print processing machines;
at least one fully automatic and/or semi-automatic actuator associated with- each of the plurality of post print processing machines, wherein the actuator is connected to the plant central control unit; and
a product detection device associated with each of the plurality of post processing machines and connected to the plant central control unit, wherein the product detection device is adapted to determine when a last partial product of a first production order has left a respective one of the plurality of post print processing machines,
wherein the machine control unit of the respective post print processing machine is adapted to transmit to the plant central control unit a readiness of the post print processing machine to be reconfigured,
wherein the plant central control unit is adapted to successively give instructions for reconfiguring the plurality of post print processing machines in sequence as the last partial product of the first production order leaves each respective machine,
wherein the respective machine control unit is adapted to receive the instructions for the re-configuration from the plant central control unit,
wherein the actuator is adapted to fully automatically or semi-automatically re-configure the post print processing machine based on the instructions depending on partial products of a following production order to be processed in the production plant,
wherein the respective machine control unit is adapted to determine when the reconfiguration of the post print processing machine is complete, and
wherein the respective machine control unit is adapted to transmit information to the plant central control unit upon completion of the re-configuration.

8. The device according to claim 7, wherein at least one of the plurality of post print processing machines is divided into segments and/or the at least one the plurality of post print processing machines forms a segment, wherein the individual segments are adapted to be reconfigured fully automatically and/or semi-automatically.

9. The device according to claim 8, wherein the plurality of post print processing machines and/or segments of the production plant are adapted by the plant central control unit to form a production line based on a respective production order, and wherein the plurality of post print processing machines and/or the segments of the production plant are adapted to be re-configured either fully automatically or semi-automatically.

10. The device according to claim 8, further comprising:
sensors connected to the product detection device, the sensors being arranged on at least one of the plurality of post print processing machines and/or the segments.

11. The device according to claim 7, further comprising:
a joint bus system linking each machine control unit of the plurality of post print processing machines to the plant central control unit.

12. The device according to claim 10, wherein the machine control unit for a respective one of the plurality of post print processing machines is connected to the sensors for product detection.

13. The device according to claim 7, further comprising:
a status indicator connected to the plant central control unit.

14. A production plant comprising the device according to claim 7.

* * * * *